July 30, 1963   J. R. WILLSON ETAL   3,099,279
COMBINATION THERMOSTAT AND SAFETY VALVE
Filed March 4, 1960

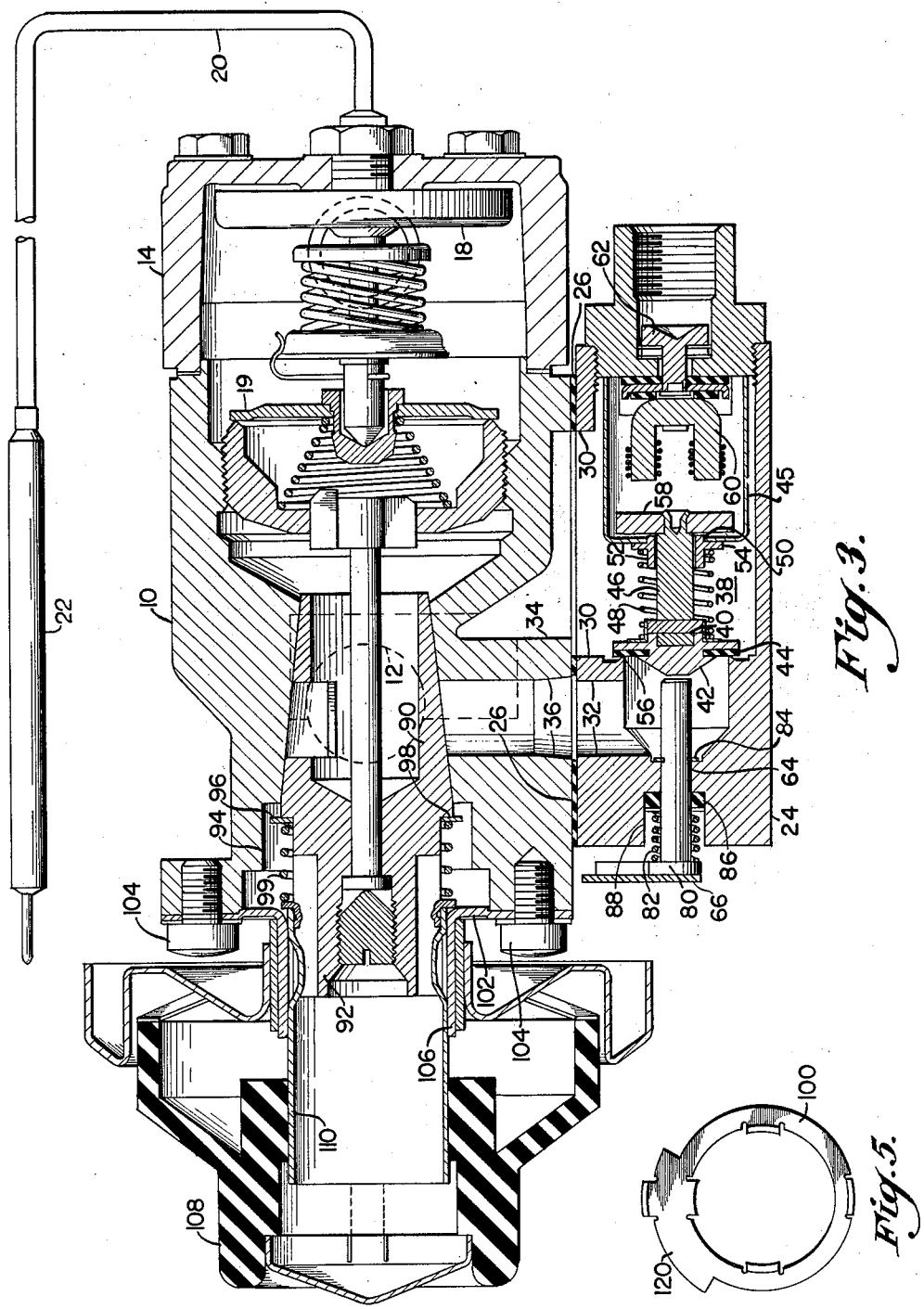

3,099,279
COMBINATION THERMOSTAT AND
SAFETY VALVE
James R. Willson, Greensburg, and Robert J. McGivern, Mount Pleasant, Pa., assignors to Robertshaw-Fulton Controls Company, Richmond, Va., a corporation of Delaware
Filed Mar. 4, 1960, Ser. No. 12,813
1 Claim. (Cl. 137—66)

The present invention relates to valves for gas ranges and more particularly to a thermostatic control and safety device for regulating the flow of gaseous fuel.

An important object of the invention is to isolate the flow path of pilot fuel from the main burner fuel.

Another important object of the invention is to avoid directing the flow of pilot fuel through the gas control cock.

Another object of the invention is to allow the ignition of fuel with the control dial at various positions so that the main fuel supply can be interrupted or not interrupted.

Another object of the invention is to insure high flow capacity in a safety mechanism.

Another object of the invention is to maintain center-line alignment of a gas supply inlet, a control valve, and a control valve dial, while maintaining a high flow capacity control of a reduced size and simplified assembly.

Other objects and advantages will become apparent from the following description taken in connection with the accompanying drawings wherein:

FIG. 3 is a longitudinal sectional view taken on the line III—III of FIG. 1 with the control dial in place;

FIG. 5 is a plan view of a detail.

Figure 1:
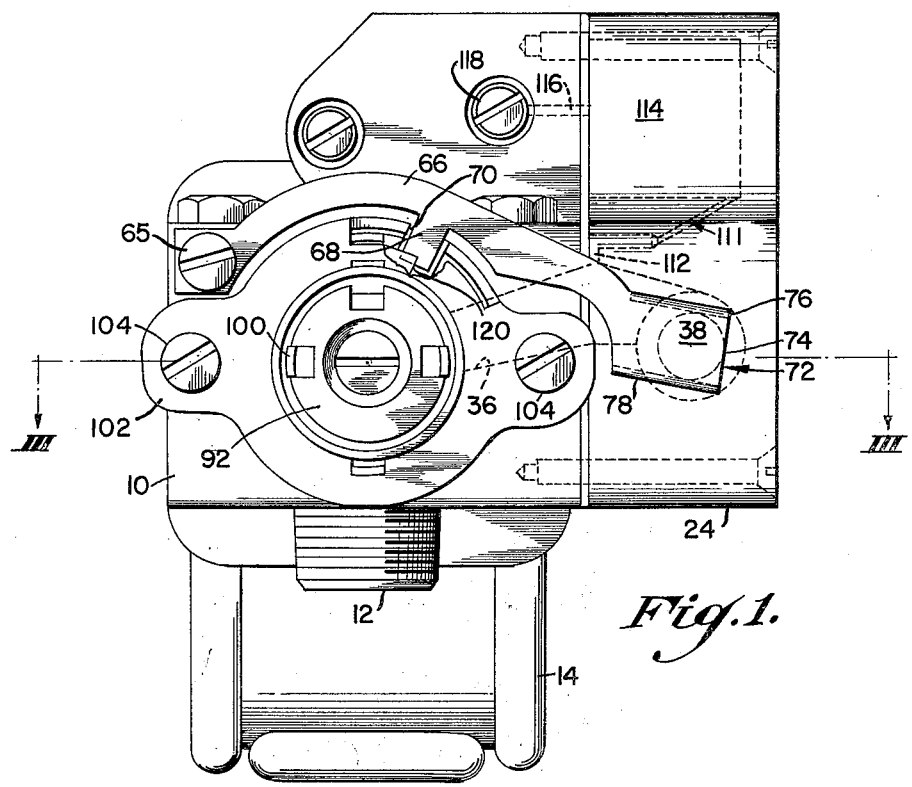
FIG. 1 is a front elevational view of a thermostatic control device embodying the invention with the control dial removed.
Figure 4:
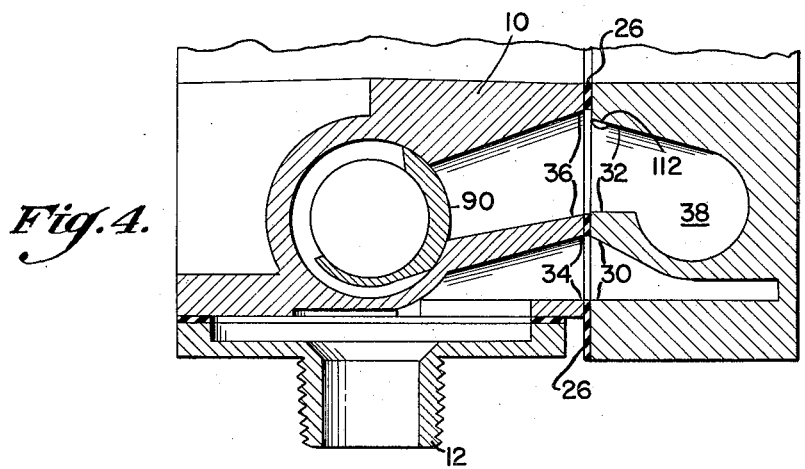
FIG. 4 is a sectional view taken along the lines IV—IV of FIG. 2.
Figure 2:
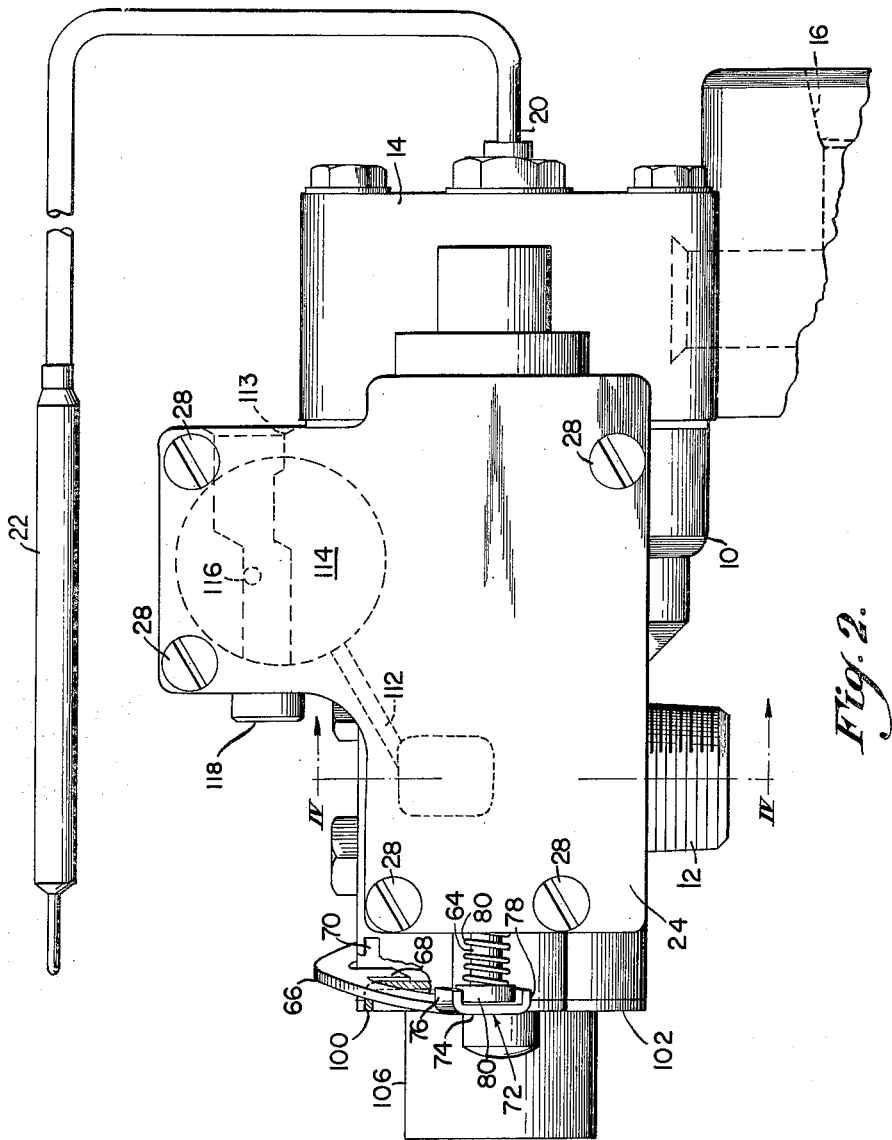
FIG. 2 is a side elevational view partly in section with the control dial removed and the outlet housing broken away.

Referring more particularly to the drawings, the control comprises a main casing 10 having a main fuel supply inlet 12 and an end casing 14 carrying a main fuel outlet 16. Thermally responsive means 18 are operatively supported within the end casing 14 and control the position of valve 19 in response to temperature changes within a heated chamber sensed by bulb 22 positioned externally of the casing 14 in the heated chamber and connected by a capillary tube 20.

A safety valve housing 24 sealingly supported on one side of the casing 10 by the gasket 26 and screws 28 is provided with an inlet port 30 and an outlet port 32. The inlet port 30 and the outlet port 32 are positioned to cooperate with a casing outlet port 34 and a casing inlet port 36 to form a fuel flow passage from the main fuel supply inlet 12 in the casing 10 outwardly through casing outlet 34 into safety valve housing inlet 30 and out of the safety valve housing outlet 32 back into the casing 10 through casing inlet 36.

Operatively mounted within a chamber 38 formed in the housing 24 is a fuel flow controlling safety valve shown generally at 40 in FIG. 3. It will be seen that the valve 40 is positioned in the fuel flow line between housing inlet port 30 and housing outlet port 32 and, in this position, is capable of controlling 100% of the fuel flow from the main fuel supply inlet 12 to the pilot. In the embodiment shown, the safety valve comprises a head 42 having a seat engaging surface of resilient sealing material 44 and a rearwardly extending stem 46.

A shell member 45 is mounted within the chamber 38 and is provided with an opening 50 at one end adapted to receive in a supporting relationship a bushing 52 having a central bore adapted to operatively receive the valve stem 46 therethrough. A coil spring 48 interposed between the rear face of the valve head 42 and an outwardly extending flange 54 provided on the bushing 52 urges the valve head 42 to a position of engagement with the valve seat 56, thus closing the fuel flow path through the safety valve housing 24.

Electromagnetic means positioned within the shell member 45 is operatively associated with a thermocouple (not shown) and is responsive to the presence or absence of a flame of sufficient size at the pilot (not shown). An armature 58 mounted inside the shell member 45 on the free end of the valve stem 46 is positioned in a magnetic attractive relationship with an electromagnet frame 60 extending into the open end of the shell member 45. Coupling means, generally shown at 62, is provided to associate the electromagnet with the thermocouple in an operative relationship. As is well known, the heat of the pilot on the thermocouple energizes the electromagnet frame 60 sufficiently to hold the armature 58 in an attracted position against the ends of the magnet frame 60 after a suitable resetting operation. Thus, safety valve 40 is held in the open position so long as the pilot flame is sufficient to keep the electromagnetic means energized.

A reset rod 64 extends through one end of the safety valve housing 24 and is operably supported to engage the head 42 of the safety valve 40. Mounted on the exterior of the main casing 10 by means of a screw 65 and extending thereacross is a reset rod operating lever 66. A lug 68 formed on the lever 66 intermediate its ends projects laterally therefrom into the interior of the main casing 10 through an opening 70 in the main casing 10. A U-shaped reset rod engaging end 72 on the lever 66 includes a bight portion 74 and a pair of inwardly extending leg portions 76, 78 adapted to receive in operative relation the headed end 80 of the reset rod 64. A coil spring 82 interposed between the housing 24 and the headed end 80 of the reset rod 64 urges the reset rod 64 outwardly into engagement with the reset rod operating lever 66 and out of engagement with the head 42 of the safety valve 40. A spring clip 84 on the reset rod 64 limits the travel of the reset rod and acts to hold the spring 82 in a compressed state. Sealing means 86 mounted within a counterbore 88 of the housing 24 is provided to insure a gas tight seal about the reset rod 64.

A main control valve means in the form of a gas cock, generally indicated at 90, is mounted within the main casing 10 and is provided with an outwardly extending operating stem portion 92. A counterbore 94 in the main casing 10 is provided to receive a washer 96 mounted on stem 92. Shoulder means 98 on the stem 92 abuts the washer 96 and limits its rearward travel. A coil spring 99 mounted on the stem 92 urges washer 96 into engagement with shoulder 98 on stem 92 and extends outwardly against a stop plate 100. A cover plate 102 is secured to the main housing 10 by screws 104 and is formed with a sleeve portion 106 positioned in a spaced relationship to the stem 92. The cover plate 102 limits the outward travel of the spring urged stop plate 100 when a control dial 108 is removed.

Control dial 108 is provided with a tubular projection 110 extending inwardly and having its internal surfaces engaging the stem 92 and its external surface engaging the sleeve portion 106 of the cover plate 102. The inwardly extending extremity of the tubular projection 110 is positioned to engage the stop plate 100 for operational movement thereof.

Thus, with the parts in assembled relation, the spring loaded stop plate 100 may be moved inwardly by depressing the control dial 108 inwardly. Referring now to FIG. 1, it will be seen that the lug 68 on the reset rod operating lever 66 which extends radially toward the longitudinal axis of the casing will present its lower extremity in the path of travel of the stop plate 100 when inward pressure is applied to the main control dial 108 overcoming the outward pressure of the coil spring 98. Accordingly, continued application of inward pressure on the main control dial 108 will result in inward deflection of the reset rod operating lever 66 relative to its supporting screw 65. Such movement will result in depression of the reset rod 64 and subsequent opening of the safety valve 40, allowing fuel to flow through the safety valve housing 24 and back into the main casing 10.

A pilot fuel passage 111 in the safety valve housing 24 extends between the safety valve housing outlet port 32 and a second outlet adjacent the main casing 10 provided by a filter chamber 114 within the housing 24. A passage 112 connects the outlet port 32 with the filter chamber 114. Pilot fuel passes through the filter chamber 114 and its appropriate filtering media (not shown) and back into the main casing 10 by way of a pilot fuel passage 116. A pilot fuel adjusting screw 118 provides the necessary control to adjust the flow of pilot fuel to the pilot fuel outlet 113 and thence to the pilot burner (not shown).

The stop plate 100 may be provided with an extended area 120 which may be placed in various positions around its periphery in order to permit lighting of the pilot by depressing the main control dial 108 in any one of a variety of positions. By utilizing any one of a number of available stop plates 100, the control can be universally utilized on various type gas ranges operating under a variety of conditions.

Operation

Assume now that the control dial is in the off position and no flame is present at the pilot and, therefore, the safety valve is closed as shown in FIG. 3.

The control dial 108 is depressed, forcing the tubular projection 110 inwardly. The projection 110 engages the stop plate 100 and urges it inwardly against the spring 99. In moving inwardly, the stop plate extended area 120 engages the lug 68 on the reset rod operating lever 66 and moves the lever 66 toward the housing 24. Screw 65 acts as a pivot point for lever 66. The reset rod 64 engaging end 72 of the lever 66 depresses the reset rod into the housing 24, thus causing engagement of the reset rod 64 and the safety valve head 42. Under pressure from the reset rod 64, the valve 40 is urged to the open position allowing fuel to flow from the main supply inlet 12 through the safety valve housing and back into the main casing 10.

It should be noted that since the main control dial 108 has been depressed but not rotated, the main gas control cock 90 remains in the closed position and fuel is allowed to flow only to the pilot through the passages 112, the pilot fuel filter 114 and the main casing pilot fuel inlet port 116. Once the pilot has been ignited, the thermocouple at the pilot will induce current flow through the electromagnet frame 60 and the armature 58 will be held in the attracted position in engagement with the frame 60 so long as flame is present at the pilot. The control dial 108 may then be rotated to open the main burner cock and allow regulated fuel flow to the main burner.

In the event of pilot failure, the thermocouple will fail to energize the magnet frame 60 and the electromagnet is rendered incapable of holding the safety valve means 40 in the open position. Safety valve 40 will close under the force of coil spring 48 and all fuel flow to the main burner and to the pilot will be stopped resulting in 100% shutoff until the cycle is repeated by the operator.

The compact nature of the structure will be apparent, together with the high degree of flexibility of use and ease of assembly owing to the utilization of a number of complete assembly units previously tested and calibrated for the desired installation. Service of any of the parts is rendered possible without the necessity of altering the calibration of the device and replacement of any of the units involved is facilitated in view of the interchangeability of the various components.

Although a preferred embodiment has been shown and described herein, it is to be understood that the invention is not limited to the details of construction and arrangement of parts disclosed except within the scope of the appended claim.

We claim:

A fuel flow device for controlling the flow of fuel to a main burner and a pilot burner comprising in combination a main casing having a fuel inlet, a main control valve means including a rotatable valve member for controlling the flow of fuel to a main burner and a pilot fuel passage for supplying fuel to a pilot burner; a housing detachably mounted to said main casing, said housing having a first fuel passage with an inlet and outlet adjacent said main casing and a second fuel passage which affords fuel flow between the outlet of said first fuel passage and a second outlet in said housing adjacent said main casing; said main casing having an outlet port affording fuel flow between said fuel inlet and the inlet of said first fuel passage whereby all fuel entering said fuel inlet passes through said first fuel passage, an inlet port affording fuel flow between the outlet of said first fuel passage to said rotatable valve member and said pilot fuel passage communicating with said second outlet for supplying fuel to a pilot burner; a manually operable electromagnetic valve adapted to be energized by a pilot burner and positioned in said first passage having an open and closed position whereby fuel flow through said fuel inlet is controlled by said electromagnetic valve; manually operable means for positioning said rotatable valve member including an element mounted for reciprocation relative to said rotatable valve member; and lever means operably associated with said reciprocable element for operating said electromagnetic valve to its open position; and interengaging means for actuating said lever means, said interengaging means being operably connected for movement with said manually operable means to position said interengaging means between said reciprocable element and said lever means whereby said lever means is actuated by movement of said reciprocable element to operate said electromagnetic valve to its open position.

References Cited in the file of this patent

UNITED STATES PATENTS

| | | |
|---|---|---|
| 2,361,944 | Jackson et al. | Nov. 7, 1944 |
| 2,483,191 | Gauger | Sept. 27, 1949 |
| 2,588,186 | Wasson | Mar. 4, 1952 |
| 2,636,505 | Paille | Apr. 28, 1953 |
| 2,834,367 | Mihm | May 13, 1958 |